United States Patent [19]
Song

[11] Patent Number: 5,850,512
[45] Date of Patent: Dec. 15, 1998

[54] BUS ANALYZER AND METHOD FOR TESTING INTERNAL DATA PATHS THEREOF

[75] Inventor: Yong-Ho Song, Seoul, Rep. of Korea

[73] Assignee: SamSung Electronics Co., Ltd., Kyungki-do, Rep. of Korea

[21] Appl. No.: 568,386

[22] Filed: Dec. 6, 1995

[30] Foreign Application Priority Data

Dec. 22, 1994 [KR] Rep. of Korea .................. 35974/1994

[51] Int. Cl.$^6$ .................................................. G06F 11/00
[52] U.S. Cl. ........................................ 395/183.19; 374/24
[58] Field of Search ................... 395/183.01, 183.19, 395/183.16; 371/24, 25.1, 26, 27

[56] References Cited

U.S. PATENT DOCUMENTS

| | | | |
|---|---|---|---|
| 4,514,845 | 4/1985 | Starr | 371/22.1 |
| 4,550,287 | 10/1985 | Badlock . | |
| 4,622,669 | 11/1986 | Pri-Tal | 371/25.1 |
| 4,847,838 | 7/1989 | Kralik | 371/29.1 |
| 4,951,283 | 8/1990 | Mastrochola et al. | 371/29.5 |
| 4,958,347 | 9/1990 | White et al. | 371/29.5 |
| 5,115,435 | 5/1992 | Langford, II et al. | 371/25.1 |
| 5,132,635 | 7/1992 | Kennedy | 371/27 |
| 5,138,257 | 8/1992 | Katsura . | |
| 5,161,162 | 11/1992 | Watkins et al. | 371/29.5 |
| 5,204,864 | 4/1993 | Won | 371/29.1 |
| 5,343,478 | 8/1994 | James et al. | 395/183.19 |
| 5,423,050 | 6/1995 | Taylor et al. | 395/183.19 |
| 5,596,715 | 1/1997 | Klein et al. | 395/183.19 |
| 5,602,989 | 2/1997 | Aria | 395/183.19 |
| 5,608,867 | 3/1997 | Ishihara | 395/183.19 |
| 5,630,048 | 5/1997 | La Joie et al. | 395/183.19 |
| 5,659,681 | 8/1997 | Ojima | 395/183.19 |

FOREIGN PATENT DOCUMENTS

| | | | |
|---|---|---|---|
| 63-39050 | 2/1988 | Japan | G06F 13/00 |
| 3159948 | 1/1991 | Japan | G06F 11/22 |
| 528058 | 2/1993 | Japan | G06F 11/22 |

*Primary Examiner*—Albert Decady
*Attorney, Agent, or Firm*—Robert E. Bushnell, Esq.

[57] ABSTRACT

A bus analyzer used in a multiprocessor computer system having a common system bus includes a bus tester for storing test data used to test the system bus and internal data paths of the bus analyzer. The test data is output to the system bus to initiate a testing operation. A trace memory sequentially receives and stores the test data provided from the system bus. A memory controller controls the trace memory to store the test data received from the system bus in response to a trace signal and interrupt storage of the test data in response to a trigger signal. A test controller generates the trace signal and the trigger signal output to the memory controller, reads the test data stored in the trace memory, and compares the test data read from the trace memory with the test data stored in the bus tester. The bus analyzer of the present invention is capable of independently testing its own internal data paths without signals provided from an external source or additional apparatus.

11 Claims, 3 Drawing Sheets

BUS ANALYZER AND METHOD FOR TESTING INTERNAL DATA PATHS THEREOF

CROSS-REFERENCE TO RELATED APPLICATIONS

This application makes reference to, incorporates the same herein, and claims all benefits accruing under 35 U.S.C. §119 from an application for Bus Analyzer And Method For Testing Internal Data Paths Thereof earlier filed in the Korean Industrial Property Office on 22 Dec. 1994 and there assigned Ser. No. 35974/1994.

BACKGROUND OF THE INVENTION

The present invention relates to a bus analyzer used in a multiprocessor computer system having a system bus, and more particularly, to a bus analyzer capable of testing its own internal data paths without the use of external signals and a method for testing the internal data paths of the bus analyzer.

With the development of multiprocessor computer systems using system data buses, the ease in which the system data bus can be analyzed for fault detection has become a significant concern. Typically, bus analysis is performed by one of two different devices. The first device is a logic analyzer which is generally used for testing digital circuitry, and the second device is a bus analyzer which is used for analyzing the state of a system bus. The logic analyzer, however, has a limited number of channels so that simultaneous inspection of all bus lines is difficult. The logic analyzer is also expensive and bulky. Therefore, its installation and transfer can pose a major inconvenience for a user. The bus analyzer, however, is mounted onto a backplane board containing the system bus. Accordingly, its installation and transfer is relatively simple as compared to the logic analyzer, and bus lines can be easily inspected. Moreover, the bus analyzer has a cost that is typically only about one-fifth the cost of the logic analyzer.

A conventional bus analyzer is disclosed in U.S. Pat. No. 5,204,864 entitled Multiprocessor Bus Debugger issued to Won on 20 Apr. 1993. Won '864 provides a multiprocessor bus debugger which does not require user knowledge of any particular assembly language or machine language. While this type of conventional art has merit in its own right, I believe that an improved bus analyzer can be contemplated. In particular, I believe that a bus analyzer capable of analyzing its own internal data paths can be constructed.

SUMMARY OF THE INVENTION

Accordingly, it is an object of the present invention to provide an improved bus analyzer and method for using the same.

It is another object to provide a bus analyzer capable of testing a system bus in a multiprocessor computer system in which a plurality of boards are commonly connected to the system bus.

It is still another object to provide a bus analyzer capable of testing its own internal data paths without the use of external signals in a multiprocessor computer system.

It is yet another object to provide a method for testing internal data paths of a bus analyzer without the use of external signals in a multiprocessor computer system.

To achieve these and other objects, the present invention provides a bus analyzer used in a multiprocessor computer system having a common system bus. The bus analyzer includes a bus tester for storing test data used to test the system bus and internal data paths of the bus analyzer. The test data is output to the system bus to initiate a testing operation. A trace memory sequentially receives and stores the test data provided from the system bus. A memory controller controls the trace memory to store the test data received from the system bus in response to a trace signal and interrupt storage of the test data in response to a trigger signal. A test controller generates the trace signal and the trigger signal output to the memory controller, reads the test data stored in the trace memory, and compares the test data read from the trace memory with the test data stored in the bus tester. The bus analyzer of the present invention is capable of independently testing its own internal data paths without signals provided from an external source or additional apparatus.

The method for testing the internal data paths of the bus analyzer, contemplates: generating test data and storing the test data in the bus tester, transmitting the test data stored in the bus tester to the system bus, generating a trace signal to trace the test data output to the system bus, tracing the test data output to the system bus in response to the trace signal by storing the test data received from the system bus in the trace memory, generating a trigger signal to stop the tracing operation, interrupting the storage of the test data within the trace memory in response to the trigger signal, and comparing the test data stored in the bus tester with the test data stored in the trace memory.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
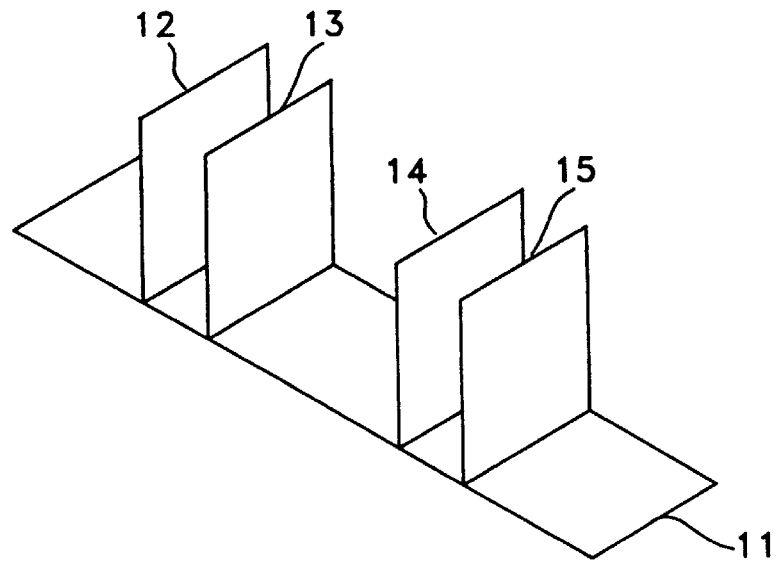
FIG. 1 is a schematic diagram of a multiprocessor computer system using a common system bus.

Turning now to the drawings and referring to FIG. 1, a schematic diagram of a multiprocessor computer system having a common synchronous bus is shown. In FIG. 1, a processor board 12, a memory board 13, an input/output (I/O) board 14 and a bus analyzer board 15 are mounted on a backplane board 11. Data transmission between the boards is performed via a system bus on backplane board 11.

Figure 2:
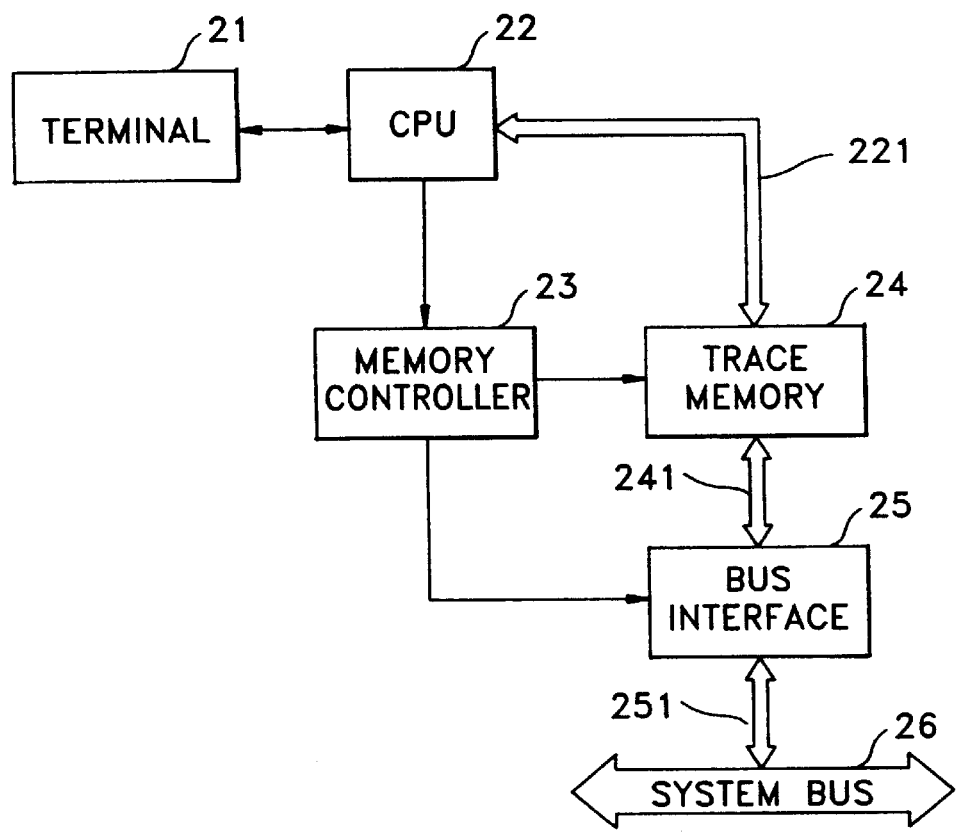
FIG. 2 is a schematic diagram showing an abstract representation of the salient features of a representative bus analyzer.

FIG. 2 is a schematic diagram showing an abstract representation of a bus analyzer contained on bus analyzer board 15. In FIG. 2, reference numeral 21 represents a terminal, reference numeral 22 represents a central processing unit (CPU), reference numeral 23 represents a memory controller, reference numeral 24 represents a trace memory, reference numeral 25 represents a bus interface, and reference numeral 26 represents a system bus. Reference numerals 221, 241 and 251 represent data paths within the bus analyzer.

When a "start tracing" command is input by a user through terminal 21, central processing unit (CPU) 22 interprets the command and relays the information to memory controller 23 which in turn outputs a control signal to bus interface 25. Bus interface 25 then opens a path buffer pursuant to the control signal to permit the transmission of data from system bus 26 to trace memory 24. At the same time, memory controller 23 also outputs address and write signals to enable sequential writing of data from system bus 26 to trace memory 24.

If a trigger signal is output from central processing unit (CPU) 22 during the trace operation, memory controller 23 interrupts output of the address and write signals to trace memory 24 and provides a control signal to bus interface 25 to close the path buffer of bus interface 25. Trace memory 24 then stops writing data and maintains the stored data.

Central processing unit (CPU) 22 reads out the data stored in trace memory 24 and displays the read data on a screen of terminal 21 according to a command from the user. This enables the user to evaluate the operation of system bus 26.

With the bus analyzer of FIG. 2, in order to analyze the data from system bus 26 during a system test, all of the data from system bus 26 is stored in trace memory 24 according to each clock pulse. Therefore, the number of data bits stored in trace memory 24 at a given time corresponds to the number of signal lines in system bus 26.

Since backplane board 11 and bus analyzer board 15 shown in FIG. 1 are used for testing the other boards (i.e., processor board 12, memory board 13 and input/output (I/O) board 14), these boards should be tested first to ensure that the other boards are properly tested. Several difficulties arise however in testing the bus analyzer of bus analyzer board 15.

First, since the bus analyzer contains a large number of signal lines that must be tested (i.e., between approximately 100 to 400 for each of the data paths 221, 241 and 251 that connect system bus 26 to central processing unit (CPU) 22), a great deal of time and effort is required to test the bus analyzer.

Secondly, since the bus analyzer is tested prior to testing the other boards, there is no reliable means for applying test data to system bus 26. Although testing of the other boards may be completed, these boards have a limited number of signal lines for driving system bus 26 and can operate only according to a predetermined bus protocol. Therefore, this impedes the testing of all of the internal data paths of the bus analyzer. For example, while it is possible to test data path 221 by writing and reading test data to and from trace memory 24 using central processing unit (CPU) 22, it is very difficult to accurately test data paths 241 and 251. To test data paths 241 and 251, test data must be manually provided from each signal line of system bus 26. Each line of data paths 241 and 251 is then individually inspected using an oscilloscope or similar means. Accordingly, testing the bus analyzer of FIG. 2 is tedious and time consuming.

Figure 3:
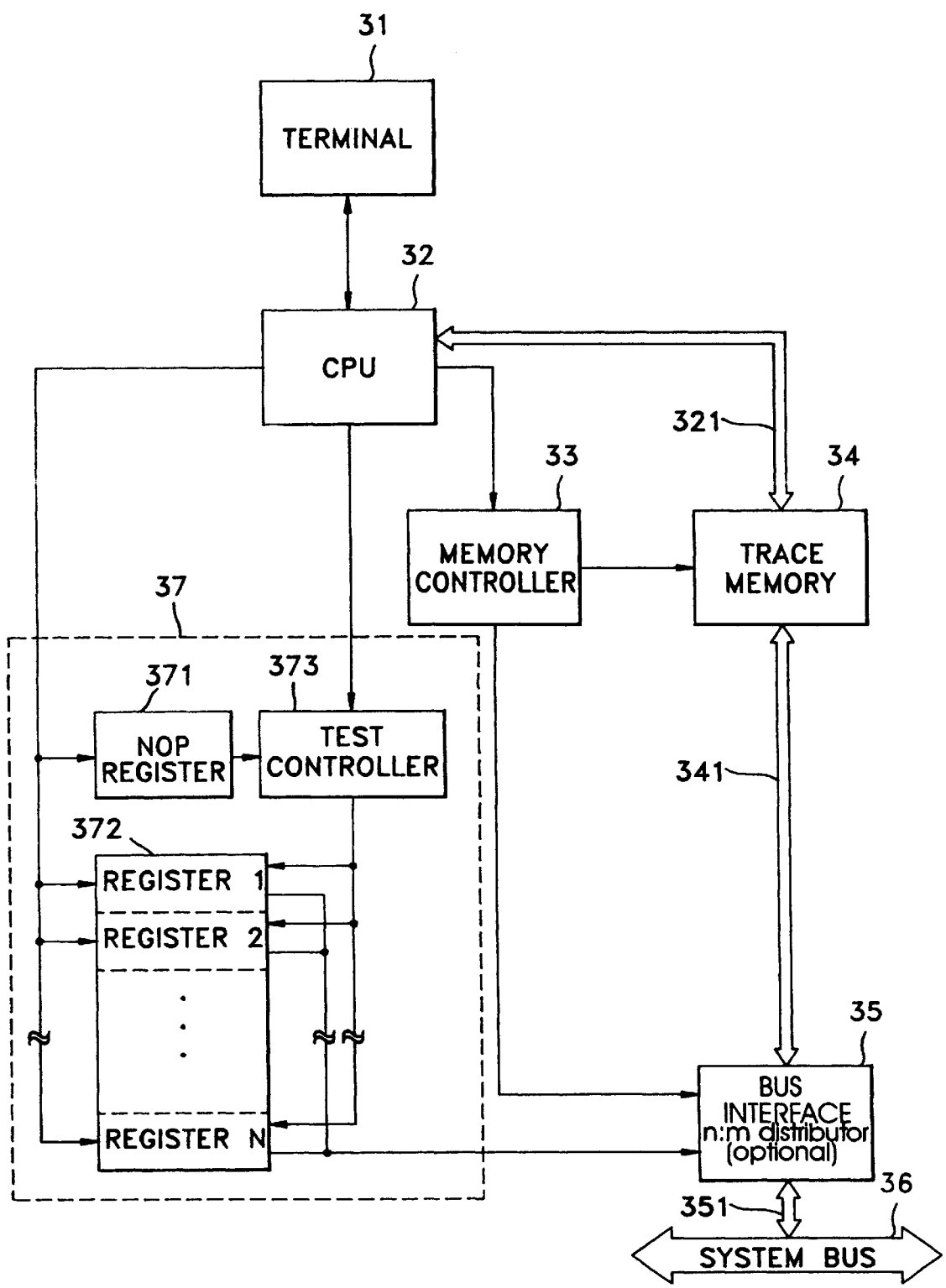
FIG. 3 is a schematic block diagram of a bus analyzer constructed according to the principles of the present invention.

FIG. 3 is a block diagram illustrating a bus analyzer constructed according to the principles of the present invention. In FIG. 3, reference numeral 31 represents a terminal for enabling a user to input commands and view test results, reference numeral 32 represents a central processing unit (CPU) for controlling the operation of the bus analyzer, reference numeral 36 represents a system bus, reference numeral 34 represents a trace memory for storing data provided from system bus 36, reference numeral 35 represents a bus interface for interfacing signals between system bus 36 and trace memory 34, reference numeral 33 represents a memory controller for controlling the operation of trace memory 34 and bus interface 35, reference numeral 37 represents a bus testing circuit for testing system bus 36 and internal data paths of the bus analyzer, and reference numerals 321, 341 and 351 represent the internal data paths of the bus analyzer.

Bus testing circuit 37 may be constructed with a pattern register portion 372 having a plurality (i.e., numbered 1 to N) of registers for storing test data to be output to system bus 36, a number-of-patterns (NOP) register 371 for storing data representative of the number of registers in pattern register portion 372 that contain test data to be output to system bus 36, and a test controller 373 for controlling the overall testing operation. Bus testing circuit 37 applies the test data to all signal lines of system bus 36. The data provided to system bus 36 is then transmitted to trace memory 34, via bus interface 35, for storage. System bus 36, as well as internal data paths 341 and 351 of the bus analyzer, are tested by comparing the test data with the data stored in trace memory 34.

Figure 4:
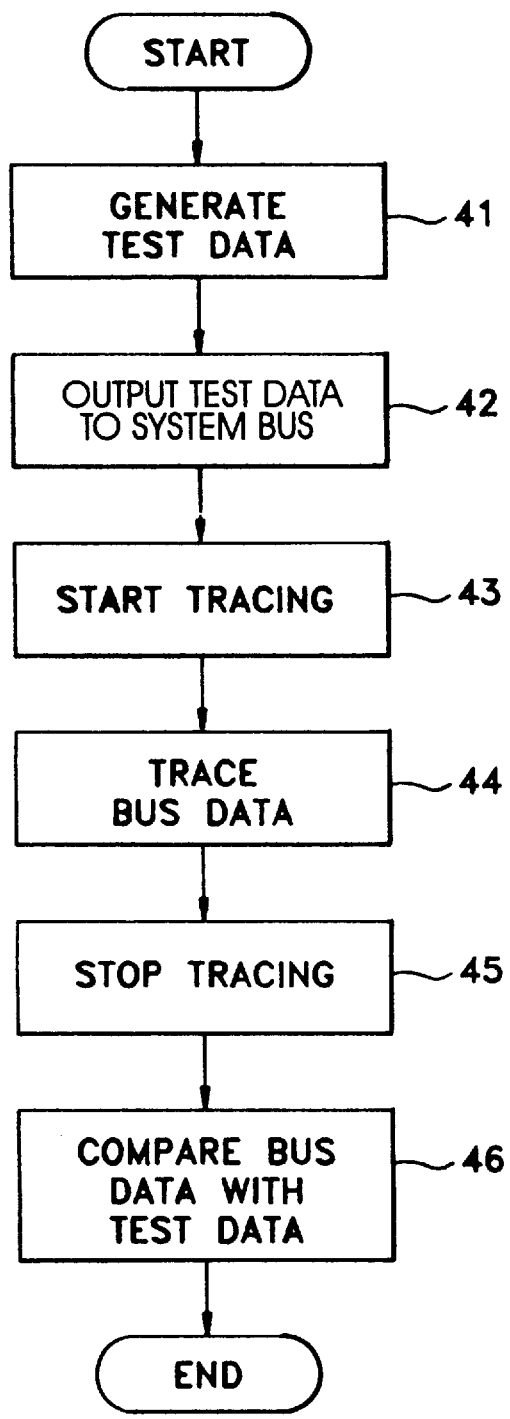
FIG. 4 is a flow chart illustrating a method for testing internal data paths of the bus analyzer constructed according to the principles of the present invention.

The operation of the bus analyzer constructed according to the principles of the present invention will now be described with reference to FIGS. 3 and 4.

To test data path 321, central processing unit (CPU) 32 writes test data directly into trace memory 34, reads out the written test data, and then compares the read data with the written test data stored in trace memory 34.

To test data paths 341 and 351, central processing unit (CPU) 32 generates test data in step 41 by controlling test controller 373 to write test data into pattern register portion 37, and write the number of patterns of test data to be applied to system bus 36 into number-of-patterns (NOP) register 371. Test controller 373 controls the input and output of data to and from pattern register portion 372 and number-of-patterns (NOP) register 371 according to the control signal from central processing unit (CPU) 32. In step 42, test controller 373 enables output of the patterns of test data stored in pattern register portion 372 to system bus 36 through bus interface 35. Central processing unit (CPU) 32 then generates a trace signal in step 43 to begin tracing the data output to system bus 36. Memory controller 33 receives the trace signal and controls bus interface 35 and trace memory 34 to trace the data by storing the data received from system bus 36 in trace memory 34 in step 44. When sufficient time has passed to enable the test data output from pattern register portion 372 to be stored in trace memory 34, central processing unit (CPU) 32 stops the tracing operation in step 45 by providing a trigger signal to memory controller 33. Central processing unit (CPU) 32 then reads out the data stored in trace memory 34 for comparison with the test data stored in pattern register portion 372 in step 46.

By varying the patterns of test data stored in pattern register portion 372, the test described above is repeatedly performed to confirm whether an irregular condition, such as an electrical short or interference, exists on any of the data paths within the bus analyzer.

The number of bits capable of being stored in each register of pattern register portion 372 is predetermined and may be equal to the number of signal lines on system bus 36. This embodiment enables the test data stored in pattern register portion 372 to be output to system bus 36 as data from system bus 36 is simultaneously provided to trace memory 34. Alternatively, the number of bits capable of being stored in each register of pattern register portion 372 may be less than the number of signal lines on system bus 36. In this case, if pattern register portion 372 uses a plurality of n-bit registers and the number of signal lines on system bus 36 is m, the present invention is carried out by incorporating an n:m distributor into bus interface 35.

As described above, the present invention provides a bus analyzer for a multiprocessor system that can test a system bus, as well as its own internal data paths. Moreover, the bus analyzer of the present invention provides the advantage of enabling its own internal data paths to be tested without using signals from other boards in the system or additional apparatus.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A method for testing a system bus of a multiprocessor system having a plurality of circuit boards and internal data paths of said bus analyzer, said method comprising the steps of:

generating a plurality of test data patterns and storing all of said plurality of test data patterns in a first memory;

transmitting said plurality of test data patterns stored in said first memory via said system bus of a multiprocessor system having a plurality of circuit boards operationally interconnected via said system bus;

generating a trace signal to begin tracing said plurality of test data patterns transmitted via said system bus;

tracing said plurality of test data patterns transmitted via said system bus in response to said trace signal upon receipt of said test data from said system bus, and storing said plurality of test data patterns in a second memory;

generating a trigger signal to stop said tracing;

interrupting storage of said plurality of test data patterns in said second memory in response to said trigger signal; and comparing said plurality of test data patterns stored in said first memory with said plurality of test data patterns stored in said second memory to test said system bus and said internal data paths of said bus analyzer.

2. A bus analyzer for testing a system bus of a multiprocessor system having a plurality of circuit boards, comprising:

testing means for storing simultaneously a plurality of test data patterns used to test said system bus and internal data paths of said bus analyzer, and transmitting sequentially said plurality of test data patterns via said system bus connecting said bus analyzer to said plurality of circuit boards in response to a control signal a bus interface for providing an interface between said bus analyzer and said system bus through a first one of said internal data paths of said bus analyzer;

a trace memory connected to said bus interface through a second one of said internal data paths of said bus analyzer, for receiving and storing said plurality of test data patterns transmitted via said system bus;

a memory controller for controlling said trace memory to store said plurality of test data patterns transmitted via said system bus in response to a trace signal, and to interrupt storage of said plurality of test data patterns in said trace memory in response to a trigger signal; and a central controller for generating said trace signal and said trigger signal, reading said plurality of test data patterns stored in said trace memory, and comparing said plurality of test data patterns read from said trace memory with said plurality of test data patterns stored in said testing means to thereby test said system bus and said first and second ones of said internal data paths of said bus analyzer.

3. The bus analyzer as claimed in claim 2, wherein said testing means comprises:

a first storage device for storing said plurality of test data patterns;

a second storage device for storing information representative of an amount of said plurality of test data patterns to be output to said system bus; and a test controller for controlling said first storage device and said second storage device to output to said system bus said plurality of test data patterns stored in said first storage device corresponding to said amount of said plurality of test data patterns represented by said information stored in said second storage device.

4. The bus analyzer as claimed in claim 3, wherein said first storage device comprises a plurality of registers each capable of storing a predetermined number of bits of said plurality of test data patterns.

5. The bus analyzer as claimed in claim 4, wherein said predetermined number of bits is equal to a number of signal lines on said system bus.

6. The bus analyzer as claimed in claim 4, wherein said predetermined number of bits is less than a number of signal lines on said system bus.

7. The bus analyzer as claimed in claim 6, wherein said bus interface provides said plurality of test data patterns from said plurality of registers of said first storage device to said system bus via said first one of said internal data paths of said bus analyzer, and for providing said plurality of test data patterns from said system bus to said trace memory via said second one of said internal data paths of said bus analyzer.

8. The bus analyzer as claimed in claim 2, wherein said testing means comprises:

a plurality of pattern registers for storing said plurality of test data patterns;

a control register for storing information indicating the number of said plurality of pattern registers; and a test controller for controlling outputs of said plurality of test data patterns from said plurality of pattern registers to all signal lines of said system bus in response to information from said control register for comparison with said plurality of test data patterns read from said trace memory to thereby test said system bus and said first and second ones of said internal data paths of said bus analyzer.

9. The bus analyzer as claimed in claim 8, wherein said plurality of pattern registers each capable of storing a predetermined number of bits of said plurality of test data patterns.

10. The bus analyzer as claimed in claim 8, wherein said predetermined number of bits of said plurality of test data patterns corresponds to a number of signal lines on said system bus.

11. The bus analyzer as claimed in claim 8, wherein said predetermined number of bits of said plurality of test data patterns is less than a number of signal lines on said system bus.

* * * * *